United States Patent [19]

Takamizawa et al.

[11] Patent Number: 4,649,185

[45] Date of Patent: Mar. 10, 1987

[54] CONTACT LENS COMPRISING TRIMETHYLVINYLSILANE POLYMER

[75] Inventors: Minoru Takamizawa; Akira Yamamoto; Toshinobu Ishihara; Shigehiro Nagura, all of Niigata, Japan

[73] Assignee: Shin-Etsu Chemical Co., Ltd., Tokyo, Japan

[21] Appl. No.: 798,757

[22] Filed: Nov. 15, 1985

[51] Int. Cl.$^4$ .............................................. C08F 30/08
[52] U.S. Cl. .................................... 526/279; 523/107
[58] Field of Search ......................... 526/279; 523/107

[56] References Cited

U.S. PATENT DOCUMENTS 4,096,315  6/1978  Kubacki ............................ 428/447
4,393,113  7/1983  Sugie et al. ....................... 526/279

Primary Examiner—Edward J. Smith
Assistant Examiner—Peter F. Kulkosky
Attorney, Agent, or Firm—Toren, McGeady and Goldberg

[57] ABSTRACT

The contact lens of the invention is shaped of a poly(-trimethylvinylsilane) resin having an average molecular weight of at least 200,000 or a copolymer based thereon. The contact lens has a very high oxygen permeability comparable to conventional transparent silicone rubbers so as to ensure a long time of continued wearing of the lens on the cornea with no adverse physiological influences and the material still has much better mechanical workability for precision shaping into a lens form than the transparent silicone rubbers.

2 Claims, No Drawings

CONTACT LENS COMPRISING TRIMETHYLVINYLSILANE POLYMER

BACKGROUND OF THE INVENTION

The present invention relates to a contact lens or, more particularly, to a contact lens made of a novel plastic material having improved properties such as oxygen permeability.

As is generally understood, plastic-made contact lenses used for correction of visual acuity must satisfy several requirements, for example, that the lens has no adverse influences on the metabolic function of the wearer's cornea with good permeability to oxygen, that the plastic has a high clarity to exhibit satisfactory effects of visual acuity correction, that the lens gives no damage to the cornea, that the surface of the lens is resistant against stain by the ingredients contained in the tear fluid, that the plastic material can be freely and precisely shaped into an optimum form to ensure smooth moving thereof on the cornea, that the plastic material is not excessively adherent to the surface of the cornea, that the lens can be easily handled with little danger of inadvertent breaking and so on.

Contact lenses made of a plastic resin currently on use are classified into hard contact lenses, the diameter of which is usually smaller than that of the cornea, and soft contact lenses, the diameter of which is usually larger than that of the cornea, according to the nature of the plastic material. None of the plastic materials used for shaping these types of contact lenses in the prior art, however, can satisfy all of the above mentioned various requirements. For example, poly(methyl methacrylate) resin, which is a typical plastic material for shaping hard contact lenses, has a problem in the low permeability coefficient to oxygen of about $0.005 \times 10^{-9}$ cm$^3$ (STP)·cm/cm$^2$·sec·cmHg to cause inhibition of the air respiration of the wearer's cornea which is a tissue void of blood vessels. Therefore, continued wearing of such a contact lens over a length of time is ophthalmically very undesirable. A conventional measure undertaken to mitigate this disadvantage is to design the contact lens with a relatively large base curvature to ensure good mobility of the lens on the cornea so as to accelerate exchange of the oxygen-containing tear fluid. This lens design is, however, not always sufficient to solve the problem in the continued wearing of the lens. In addition, the high mobility of the lens is necessarily accompanied by an increased danger of dropping of the lens from the eye, for example, by a strong blinking of the eyelids and unpleasant feeling of the wearer caused by touching of the lens to the upper and lower eyelids.

Several proposals and attempts have been made to increase the oxygen permeability of contact lenses made of a poly(methyl methacrylate) resin according to which the resin is modified by the copolymerization of methyl methacrylate with certain organosilicon compounds (see, for example, Japanese Patent Kokai Nos. 50-87184 and 54-55455). Such a copolymeric poly(methyl methacrylate) resins are still insufficient in respect of the oxygen permeability which is far from giving full supply of the oxygen physiologically required by the cornea through the lens.

In view of the above described problems of hard contact lenses in respect of the oxygen permeability and wearer's feeling, soft contact lenses have been developed using a relatively flexible plastic material which is typically a poly(2-hydroxyethyl methacrylate) of a hydrated gel type or a transparent silicone rubber of a non-hydrated elastomer type. The former material, however, has several disadvantages that the material is less suitable for the visual acuity correction than the hard contact lenses made of a poly(methyl methacrylate) resin, that the material is mechanically not strong enough to become sometimes damaged, that the material as a hydrated gel is susceptible to stain by the tear fluid and uptake of the chemical ingredients containing in the cleaning solution and that the oxygen permeability of the material is not always sufficiently high to satisfy the oxygen demand of the cornea. The latter material of transparent silicone rubbers has problems in the exact shaping works into the desired lens form as a natural consequence of the elastomeric nature thereof and in the ready deposition of the constituents in the tear fluid inside the lens although the material is advantageous in respect of the high oxygen permeability.

SUMMARY OF THE INVENTION

It is therefore an object of the present invention to provide a novel and improved contact lens free from the above described problems and disadvantages in the contact lenses of the prior art.

A further object of the invention is to provide a contact lens made of a novel plastic material having an outstandingly high oxygen permeability coefficient to enable the wearer to continuedly wear the contact lens over a long time.

Thus, the contact lens of the invention is a lens wearable on the cornea made by shaping a polymeric resin, wholly or mainly, composed of a poly(trimethyl vinyl silane) having an average molecular weight of at least 200,000.

DETAILED DESCRIPTION OF THE PREFERRED EMBODIMENTS

As is understood from the above given summarizing description, the characteristic feature of the inventive contact lens is that the lens is made of a unique polymeric material of a poly(trimethyl vinyl silane), i.e. a polymer of trimethyl vinyl silane, having a specified average molecular weight. The polymer having such a relatively high molecular weight can readily be prepared by the anionic bulk polymerization of purified trimethyl vinyl silane monomer with admixture of a polymerization catalyst, which is preferably n-butyl lithium, carried out for a length of time of 20 to 50 hours at a temperature in the range from about 50° C. to about 70° C. in an atmosphere of an inert gas.

The poly(trimethyl vinyl silane) has an oxygen permeability coefficient of about $4.5 \times 10^{-9}$ cm$^3$ (STP)·cm/cm$^2$·sec·cmHg or larger, which is much larger even than the reported value of about $1.0 \times 10^9$ in the same unit of a copolymer of methyl methacrylate and siloxanyl methacrylate, to ensure safe continued wearing of the contact lens over a long time. Moreover, the polymer has excellent mechanical strengths and good workability in the mechanical works so that the contact lens can be shaped with high dimensional accuracy.

It is essential that the poly(trimethyl vinyl silane) has an average molecular weight of at least 200,000 or, preferably, at least 400,000. A polymer having a smaller average molecular weight than above is undesirable due to the poor mechanical strengths and difficulties encountered in the mechanical precision works for shaping the polymer into lenses.

Although homopolymeric poly(trimethyl vinyl silane) resins are quite satisfactory as a material of the inventive contact lens, it is optional that the inventive contact lens is shaped of a copolymeric resin prepared by the copolymerization of a major amount, e.g. 50% by weight or more, of trimethyl vinyl silane and a minor amount, e.g. 50% by weight or less, of another monomer or monomers copolymerizable with the silane or, in particular, block copolymerization with poly(trimethyl vinyl silane). For example, trimethyl vinyl silane can be copolymerized with styrene, methyl methacrylate, siloxy methacrylates and the like. Block copolymers of poly(trimethyl vinyl silane) with polystyrene, poly(-methyl methacrylate), organopolysiloxanes, poly(siloxy methacrylate) and the like are suitable.

Although the method for shaping the poly(trimethyl vinyl silane) into the form of a contact lens is not particularly limitative, it is a convenient way that a preform of plate, block or any other suitable form of the polymer is first shaped by casting a solution of the polymeric resin in a suitable organic solvent into a mold and the preform is then mechanically worked by cutting, shaving and grinding into the desired form of the lens.

Following are the examples to illustrate the inventive contact lens in more detail.

EXAMPLE 1

A poly(trimethyl vinyl silane) resin was prepared by heating 50 g of trimethyl vinyl silane admixed with 0.1 ml of a 15% hexane solution of n-butyl lithium at 60° C. for 24 hours under an anhydrous condition in an atmosphere of nitrogen to effect anionic polymerization of the monomer. The polymer was dissolved in 500 ml of cyclohexane and the solution was poured into a large volume of methyl alcohol to precipitate the polymer which was collected by filtration and dried to give 45 g of a purified poly(trimethyl vinyl silane) resin. The polymer had an average molecular weight of 650,000 as determined by the gel permeation chromatography with reference to polystyrene.

The thus obtained polymer was dissolved in cyclohexane in a concentration of 5% by weight and the solution after filtration was cast into a mold to prepare a preform in the form of a colorless and transparent film by evaporating the solvent. The film was mechanically worked into a disc of 18 mm diameter and 0.2 mm thickness of which the oxygen permeability coefficient was determined to give a value of $4.5 \times 10^{-9}$ cm$^3$ (STP)·cm/cm$^2$·sec·cmHg.

The above prepared preform of film-like form was mechanically worked by cutting and grinding into a contact lens having a base curvature of 7.70 mm, front curvature of 8.10 mm, center thickness of 0.12 mm and diameter of 9.0 mm. The mechanical workability of the resin preform was satisfactory both in cutting and grinding. The actual wearing test of the thus prepared contact lens gave quite satisfactory results in respect of the wearer's feeling and correction of visual acuity which was as good as that with a poly(methyl methacrylate)-made contact lens. When a long-time continued wearing test was undertaken by a patient who could hardly endure a continued wearing of a poly(methyl methacrylate)-made contact lens in a best-fit condition over a length of about 8 hours or longer due to hyperemia in the eye and excessive volume of tear excretion, the result was that the length of time for continued wearing of the lens could be extended to 12 hours or longer.

EXAMPLE 2

A poly(trimethyl vinyl silane) resin was prepared from 50 g of the monomer in just the same manner as in Example 1. The polymer was dissolved in 500 ml of anhydrous cyclohexane and further the solution was admixed dropwise with 20 g of dimethylsiloxane trimer over a period of 30 minutes to effect reaction by heating at 60° C. for 1 hour. In the next place, the reaction mixture was admixed with 500 ml of anhydrous tetrahydrofuran and heated for 4 hours under reflux of the solvent.

The reaction mixture after completion of the reaction was poured into a large volume of methyl alcohol to precipitate the polymer and the precipitates were collected by filtration and dried to give 64 g of a purified resin which was a block copolymer of poly(trimethyl vinyl silane) and polydimethylsiloxane. The copolymeric resin had an average molecular weight of 950,000 and an oxygen permeability coefficient of $1.8 \times 10^{-8}$ in the same unit as in Example 1 as determined also in the same manner as in Example 1.

The tests of the thus obtained copolymeric resin for the mechanical working into a contact lens and actual wearing test of the contact lens by a patient gave results as good as in Example 1.

What is claimed is:

1. A contact lens which is a lens wearable on the cornea made by shaping a polymeric resin comprising a poly(trimethylvinyl silane) having an average molecular weight of at least 200,000 and wherein the polymeric resin contains at least 50% by weight of a poly(trimethylvinyl silane).

2. The contact lens as claimed in claim 1 wherein the poly(trimethyl vinyl silane) has an average molecular weight of at least 400,000.

* * * * *